United States Patent
Diaz Mateos et al.

(10) Patent No.: US 8,320,966 B2
(45) Date of Patent: Nov. 27, 2012

(54) REDUCING POWER CONSUMPTION OF INDOOR BASE STATIONS

(75) Inventors: Maria Diaz Mateos, Madrid (ES); Julio Urbano Ruiz, Madrid (ES); Francisco Javier Dominguez Romero, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 107 days.

(21) Appl. No.: 12/827,187

(22) Filed: Jun. 30, 2010

(65) Prior Publication Data

US 2010/0331049 A1 Dec. 30, 2010

(30) Foreign Application Priority Data

Jun. 30, 2009 (ES) .................................. 200930381

(51) Int. Cl.
*H04M 1/00* (2006.01)

(52) U.S. Cl. ........ 455/561; 455/572; 455/574; 455/420; 455/556.1; 455/19; 455/422.1

(58) Field of Classification Search .................. 455/561, 455/572, 574, 420, 556.1, 19, 422.1
See application file for complete search history.

(56) References Cited

U.S. PATENT DOCUMENTS

| | | | |
|---|---|---|---|
| 2006/0253570 A1* | 11/2006 | Biswas et al. | 709/224 |
| 2007/0066273 A1* | 3/2007 | Laroia et al. | 455/343.2 |
| 2009/0040106 A1* | 2/2009 | Le et al. | 342/372 |
| 2010/0056184 A1* | 3/2010 | Vakil et al. | 455/456.5 |
| 2010/0061356 A1* | 3/2010 | Qvarfordt et al. | 370/338 |
| 2010/0157891 A1* | 6/2010 | Mikan et al. | 370/328 |
| 2010/0173630 A1* | 7/2010 | Han et al. | 455/433 |

FOREIGN PATENT DOCUMENTS

WO WO 2008/131588 * 11/2008

* cited by examiner

*Primary Examiner* — Barry Taylor
(74) *Attorney, Agent, or Firm* — B. Aaron Schulman, Esq.; Nicholas B. Trenkle, Esq.; Stites & Harbison, PLLC

(57) ABSTRACT

System, method and indoor antenna for reducing power consumption of base stations providing indoor coverage. The system comprises a base station (1), at least one indoor antenna (2) connected to the base station (1) providing coverage in an indoor coverage area and means for detecting human presence in a detection area. The base station (1) is configured to:

receive (40) the information provided by the means for detecting human presence;

check (42), according to said information, if human presence has been detected in the detection area, and in that case switch on (44) the base station (1); if human presence has not been detected in the detection area:

check (45) if there is no traffic in the base station (1) during a predetermined period of time, and in that case switch off (46) the base station (1).

14 Claims, 4 Drawing Sheets

REDUCING POWER CONSUMPTION OF INDOOR BASE STATIONS

FIELD OF THE INVENTION

The present invention is comprised within the field of mobile telecommunications, and more specifically in a system, method and indoor antenna for reducing power consumption in base stations providing indoor coverage.

BACKGROUND OF THE INVENTION

It is typical in mobile networks (2G, 3G, LTE, etc) to provide indoor coverage in offices, tunnels, commercial centers, etc. This indoor coverage is always available, even when there are not users, and the result in these cases is a waste of energy, and an unnecessary cost for the operators.

So, for example, it is very typical to provide an indoor coverage in offices, and coverage is available during the night or during the weekends, although there are not people working or there is no machine-to-machine communications, wasting energy.

The present invention solves the commented problems by providing a switch-on/switch-off cell based on movement. The present invention saves power consumption for all radio systems, including 2G and 3G.

DESCRIPTION OF THE INVENTION

The invention relates to systems, methods, and indoor antennas for reducing power consumption of base stations providing indoor coverage.

The present solution proposes to switch off the indoor cells when there are no users, and to switch them on when users are present again. Cell switching-off means that all carriers and all pilots inside the carriers will be off. Cells will be switched on or off thanks to a motion sensor integrated into the antenna, that will send messages to the base station depending on movement detection: if movement (people), station will be on, and if not movement (not people), station will be off; additionally there will be hysteresis parameters in order to avoid ping-pong.

The system comprises a base station, at least one indoor antenna connected to the base station providing coverage in an indoor coverage area, and means for detecting human presence in a detection area. The base station is configured to:
  receive the information provided by the means for detecting human presence;
  check, according to said information, if human presence has been detected in the detection area, and in that case switch on the base station;
if human presence has not been detected in the detection area:
  check if there is no traffic in the base station during a predetermined period of time, and in that case switch off the base station.

The base station can be further configured to, in case human presence has not been detected but traffic in the base station has been detected, check if there is coverage from at least one neighbor cell, and in that case switch off the base station.

In a preferred embodiment, the means for detecting human presence comprises at least one motion sensor. Said means preferable comprise a motion sensor integrated in each antenna, each motion sensor being fed through the RF cable used for the communication between the corresponding antenna and the base station; the base station being configured to receive the information provided by each motion sensor through said RF cable. The system can also comprise a bias T for each antenna to send DC power to each motion sensor.

The detection area is preferably comprised within the indoor coverage area. The detection area can also be close to the indoor coverage area, for instance for detecting vehicles entering a tunnel.

The corresponding method proposed by the invention comprises:
  detecting human presence in a detection area,
  receiving the base station the information provided by the means for detecting human presence;
  checking, according to said information, if human presence has been detected in the detection area, and in that case switching on the base station;
if human presence has not been detected in the detection area:
  checking if there is no traffic in the base station during a predetermined period of time, and in that case switching off the base station.

The method can further comprise, in case human presence has not been detected but traffic in the base station has been detected, checking if there is coverage from at least one neighbor cell, and in that case switching off the base station.

The indoor antenna, also proposed by the present invention, for reducing power consumption of a base station providing indoor coverage, is configured to be connected to the base station and comprises a motion sensor integrated in the antenna, the motion sensor being configured to:
  be fed through the RF cable used for the communication between the antenna and the base station;
  send, to the base station and through the RF cable, its control signals.

BRIEF DESCRIPTION OF THE DRAWINGS

A series of drawings which aid in better understanding the invention and which are expressly related with an embodiment of said invention, presented as a non-limiting example thereof, are very briefly described below.

DESCRIPTION OF A PREFERRED EMBODIMENT OF THE INVENTION

Figure 1:
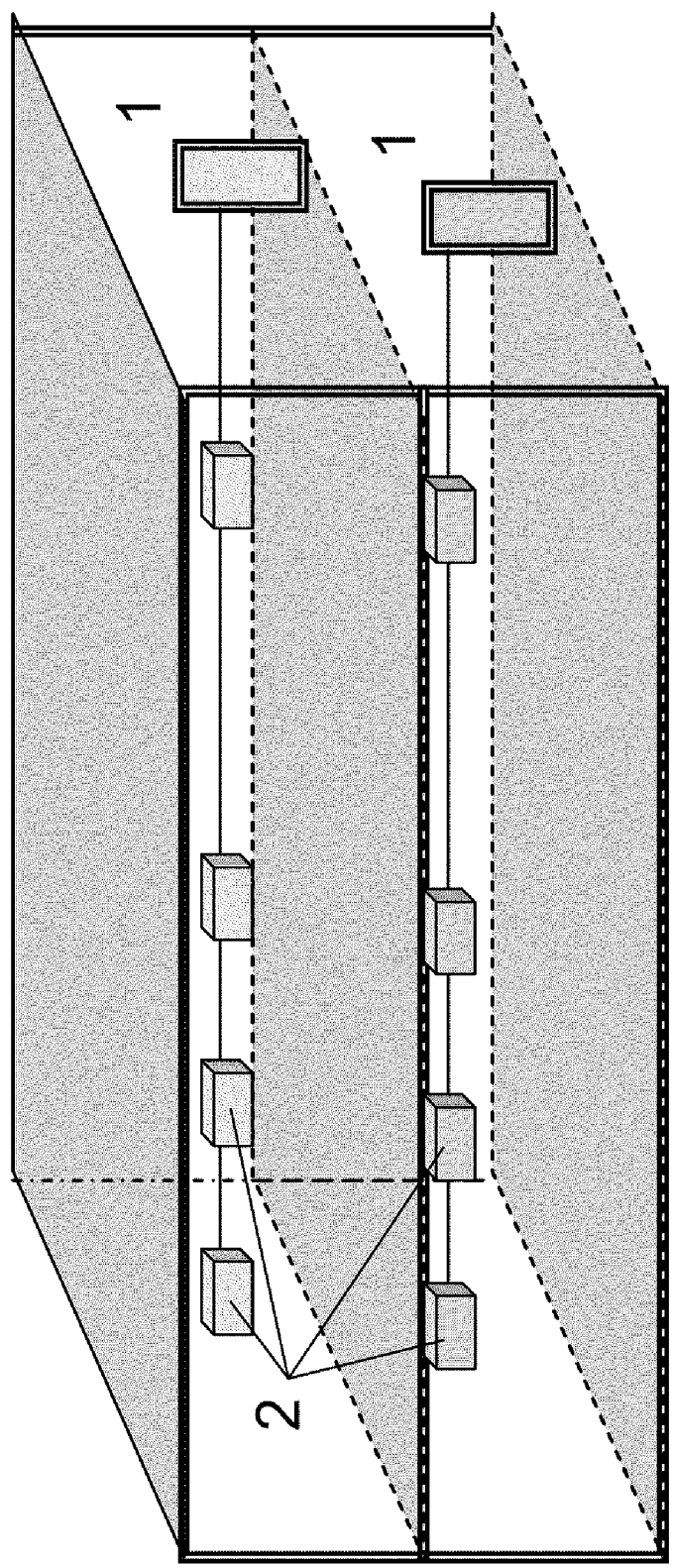
FIG. 1 shows an indoor coverage situation according to the state of the art.

Indoor coverage is normally provided through base stations 1 (nodes B, microcells or repeaters), and there are normally several indoor antennas 2 (small size) distributed along the place (floors of the building, tunnel, etc), and all of them connected to the same base station, as it can be seen in FIG. 1.

It is important to remark that although most of the traffic in the cells are coming from mobiles used by people, there can be machine-to-machine communications, and therefore the solution proposes to switch off the indoor cells when there are not users and there is not machine-to-machine traffic in the cell, and to switch on the cell where there are users or machine-to-machine traffic. In this context, switching off means that all carriers and all pilots inside the carriers will be off.

Solution to switch on/switch off system can be done in two steps:
Human traffic detection.
Optimization traffic algorithm.

There are two kind of possible traffic: human and machine-to-machine. The first step is focused in the human traffic.

Figure 2:
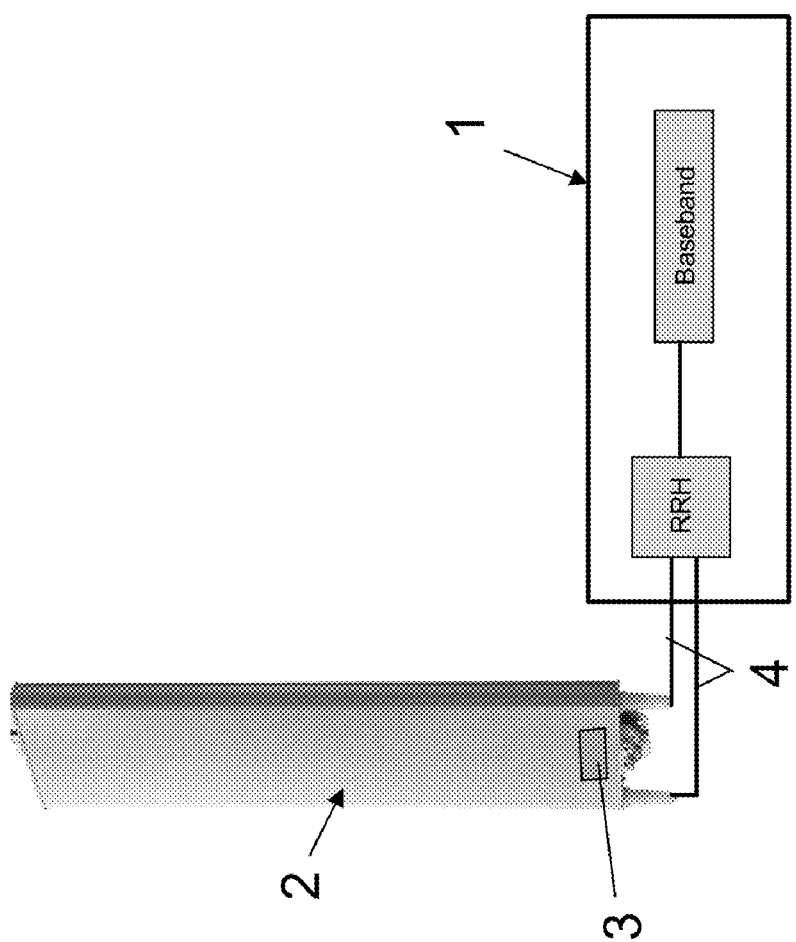
FIG. 2 shows a sensor integrated into the antenna to detect movement, according to a first embodiment of the present invention.

The proposal to detect human traffic is through a motion detector, and to do it, there are different options:

Integrate a motion sensor 3 into the antenna 2, as shown in FIG. 2. Innovation of this option is that sensor is integrated into the antenna 2, and it means that the communication between the motion sensor 3 and the base station 1 (e.g., node B) will be done trough the same RF cable 4 than the communication between the antenna 2 and the base station 1, so it will make much easier the installation in case of a new antenna 2 installed, and also in case an older antenna 2 is replaced. It is possible to send the DC power to feed the motion sensor 3 and the control signals over the same RF cables 4. The control signals can be sent using a different band of the RF and the DC power using a bias "T" device.

A bias "T" is used to insert DC power into an AC signal to power remote antenna amplifiers or other devices. It is usually positioned at the receiving end of the coaxial cable to pass DC power from an external source to the coaxial cable running to powered device. A bias "T" consists of a feed inductor to deliver DC to a connector on the device side and a blocking capacitor to keep DC from passing through to the receiver. The RF signal is connected directly from one connector to the other with only the blocking capacitor in series.

On the other side, movement could be detected any time, as there is a continue communication between the motion sensor 3 of the antenna 2 and the base station 1.

Figure 3:
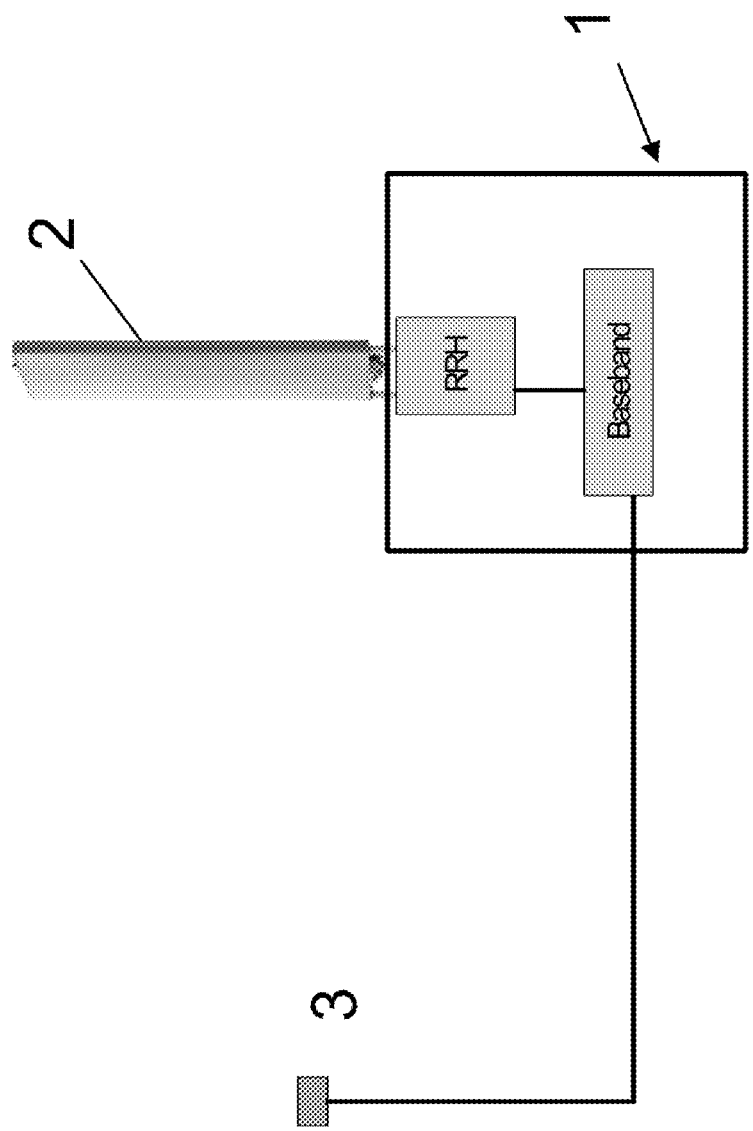
FIG. 3 shows another embodiment of the invention, in which the motion sensor is not integrated in the antenna.

A motion sensor 3 separated of the antenna 2 (FIG. 3), that could be needed in case of some specific applications, like tunnels, as cars have a high speed and it is necessary to guarantee that once the car is inside the "indoor coverage area" the base station is working fine, so motion detector 3 should be meters out of the tunnel.

There could be other options to detect the human presence as video-surveillance system, doors movement, steps ground detection, but the preferred ones are the above systems.

Figure 4:
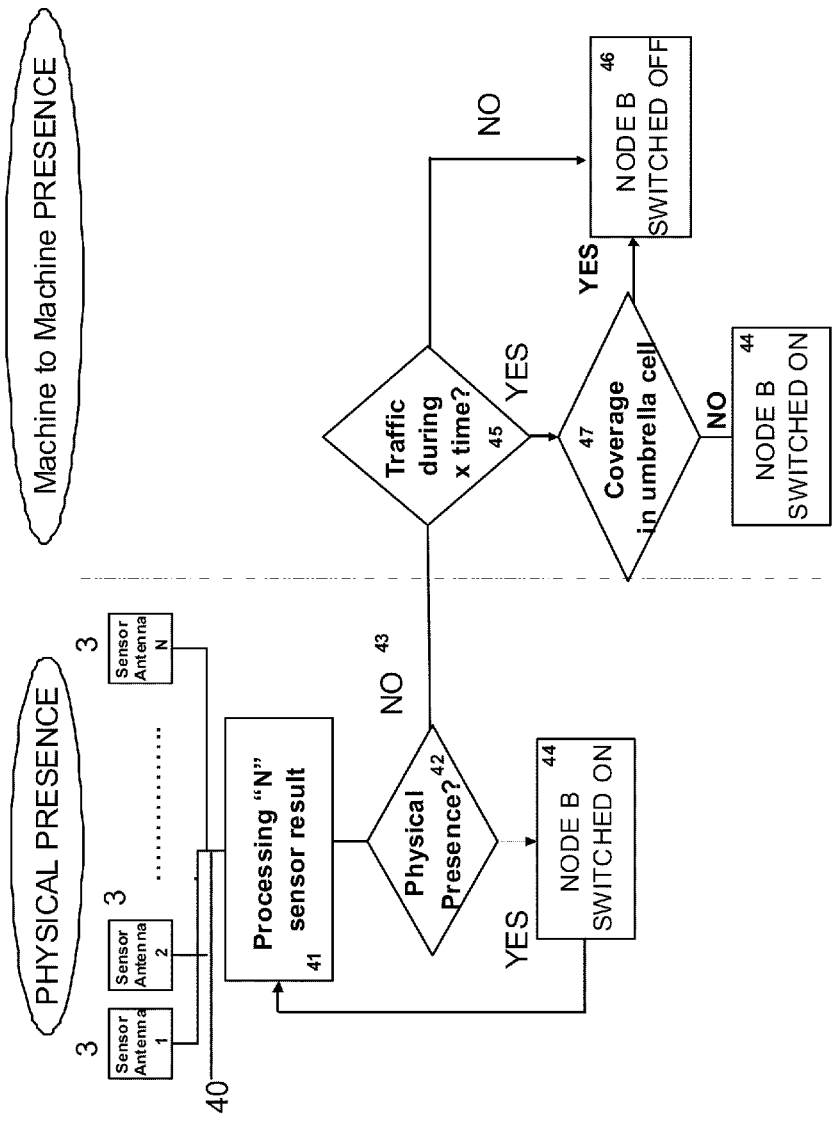
FIG. 4 shows the optimization traffic algorithm according to the invention.

Regarding the second step, optimization traffic algorithm, in order to minimize power consumption and guarantee coverage available only when needed, the present invention proposes the next algorithm, to be executed in the base station 1, that take into account human and machine-to-machine traffic. The algorithm is shown in FIG. 4.

Steps followed by the algorithm are:

First of all, human presence in the area is checked. The base station 1 process 41 the N (supposing there are N antennas controlled by this base station 1) results of movement detected in each antenna 2 (like the ones described in FIG. 1), which is the input 40 for the base station 1. The base station checks 42 if there is a human presence. In case there is not movement detection in any of the antennas 2, the final output will be not movement in the area (reference 43), and in case there is movement detection in any of the antennas, the final output will be movement in the area, so the base station will be switched on (reference 44).

Once it is determined that there are no people in the area, it is checked if there is any machine-to-machine communication, and in this case, traffic of the cell will be checked 45.

If there is no traffic detection in the base station 1 during the last x minutes (being x a configurable parameter), it will mean that there is no machine-to-machine communication, so base station 1 will be switched off 46. For example, this x parameter can be set at 1, 2, 3 hours, because the operator knows the traffic profile of the machine-to-machine, ensuring that given a typical behavior in that cell, if there is no traffic during this time, there is no machine-to-machine traffic in the cell.

If there is traffic in the base station 1, it will mean that some machine-to-machine communication is established, so it will be checked 47 if there is coverage from other base station, reading in the signaling flow of the communication if there are neighbor cells or not, or with a parameter indicating this.

if there is coverage from other neighbor cells (called umbrella cell), node B will be switched off 46.

if there is no coverage from other neighbor cells, node B will be kept switched on 44.

Therefore, the off-to-on transition will be done automatically, to guarantee 100% time coverage, and the on-to-off transition can be configured with a threshold time x, in order to avoid ping-pong, so the base station 1 will be maintained on until it passes a certain time (a timer can be configured) after the last movement detected to avoid switching off and on continuously.

This algorithm can be run 24 hours a day or only in predefined hours of the day/week through some parameters defining the starting time and the final time.

The invention claimed is:

1. System for reducing power consumption of base stations providing indoor coverage, the system comprising:
   a base station and at least one indoor antenna connected to the base station providing coverage in an indoor coverage area; and
   means for detecting human presence in a detection area of the means for detecting human presence,
   wherein the base station is configured to:
   receive information provided by the means for detecting human presence;
   check, according to said information, if human presence has been detected in the detection area;
   switch on the base station if human presence has been detected in the detection area; and
   if human presence has not been detected in the detection area:
   check if there is no traffic in the base station during a predetermined period of time, and in that case switch off the base station.

2. System according to claim 1, characterized in that the base station is further configured to, in case human presence has not been detected but traffic in the base station has been detected, check if there is coverage from at least one neighbor cell, and in that case switch off the base station.

3. System according to claim 1, characterized in that the means for detecting human presence comprises at least one motion sensor.

4. System according to claim 1, characterized in that the means for detecting human presence comprises a motion sensor integrated in each antenna, each motion sensor being fed through the RF cable used for the communication between the corresponding antenna and the base station; the base station being configured to receive the information provided by each motion sensor through said RF cable.

5. System according to claim 1, characterized in that it comprises a bias T for each antenna to send DC power to each motion sensor.

6. System according to claim 1, characterized in that the detection area is comprised within the indoor coverage area.

7. System according to claim 1, characterized in that the detection area is close to the indoor coverage area.

8. Method for reducing power consumption of base stations providing indoor coverage, the base station being connected to at least one indoor antenna providing coverage in an indoor coverage area; characterized in that it comprises:
    detecting human presence in a detection area of a means for detecting human presence,
    receiving information provided by the means for detecting human presence at the base station;
    checking, according to said information, if human presence has been detected in the detection area;
    switching on the base station if human presence has been detected in the detection area; and
    if human presence has not been detected in the detection area:
        checking if there is no traffic in the base station during a predetermined period of time, and in that case switching off the base station.

9. Method according to claim 8, characterized in that it further comprises, in case human presence has not been detected but traffic in the base station has been detected, checking if there is coverage from at least one neighbor cell, and in that case switching off the base station.

10. Method according to claim 8, characterized in that the detection of human presence is carried out by at least one motion sensor.

11. Method according to claim 10, characterized in that a motion sensor is integrated in each antenna and fed through the RF cable used for the communication between the corresponding antenna and the base station; the receiving of the information provided by each motion sensor being carried out through said RF cable.

12. Method according to claim 8, characterized in that the detection area is comprised within the indoor coverage area.

13. Method according to claim 8, characterized in that the detection area is close to the indoor coverage area.

14. Indoor antenna for reducing power consumption of a base station providing indoor coverage, the indoor antenna being configured to be connected to the base station, the indoor antenna comprising:
    a motion sensor integrated in the antenna, the motion sensor being configured to:
    feed information through an RF cable used for communication between the antenna and the base station; and
    send, to the base station and through the RF cable, control signals for the base station.

* * * * *